(12) United States Patent
Laurent

(10) Patent No.: US 8,336,394 B2
(45) Date of Patent: Dec. 25, 2012

(54) DEVICE FOR MEASURING THE FLOW RATE OF A FLUID FLOWING IN A PIPE

(75) Inventor: Denis Laurent, Epernon (FR)

(73) Assignee: Metering & Technology SAS (FR)

( * ) Notice: Subject to any disclaimer, the term of this patent is extended or adjusted under 35 U.S.C. 154(b) by 345 days.

(21) Appl. No.: 12/812,527

(22) PCT Filed: Jan. 10, 2008

(86) PCT No.: PCT/FR2008/000028
§ 371 (c)(1),
(2), (4) Date: Jul. 12, 2010

(87) PCT Pub. No.: WO2009/087280
PCT Pub. Date: Jul. 16, 2009

(65) Prior Publication Data
US 2010/0294045 A1 Nov. 25, 2010

(51) Int. Cl.
*G01F 1/66* (2006.01)
(52) U.S. Cl. .................................................. 73/861.29
(58) Field of Classification Search ............... 73/152.03, 73/152.58, 152.47, 861.27, 861.29, 861.31
See application file for complete search history.

(56) References Cited

U.S. PATENT DOCUMENTS

| | | | | |
|---|---|---|---|---|
| 4,149,409 A | * | 4/1979 | Serata | 73/152.03 |
| 4,162,630 A | | 7/1979 | Johnson | |
| 4,462,261 A | | 7/1984 | Keyes et al. | |
| 4,641,520 A | * | 2/1987 | Mao | 73/152.58 |
| 4,791,797 A | * | 12/1988 | Paske et al. | 73/152.03 |
| 5,719,329 A | | 2/1998 | Jepson et al. | |
| 5,753,812 A | * | 5/1998 | Aron et al. | 73/152.47 |
| 6,067,861 A | | 5/2000 | Shekarriz et al. | |

* cited by examiner

*Primary Examiner* — Jewel V Thompson
(74) *Attorney, Agent, or Firm* — Gerald E. Hespos; Michael J. Porco

(57) ABSTRACT

A device (10) for measuring the flow rate of a fluid flowing in a pipe, especially for a transaction between a hydrocarbon supplier and a hydrocarbon purchaser is provided. The device (10) has a cylindrical body (11) to be interposed between two sections of the pipe. Ultrasound-beam transducers (15) are mounted on the main body (11) and intended to measure at least a rate of movement of the fluid stream as this flows through the device (10). At least one converter converts the signals emitted by the transducers into a flow rate signal. The transducers (15) are mounted and uniformly distributed on two coaxial parallel rings (12, 13). The transducers (15) of a first ring (12) are angularly offset relative to the transducers of the second ring (13).

8 Claims, 6 Drawing Sheets

DEVICE FOR MEASURING THE FLOW RATE OF A FLUID FLOWING IN A PIPE

SUMMARY OF THE INVENTION

1. Field of the Invention

The present invention relates to a device for measuring the flow rate of a fluid flowing in a pipe.

2. Description of the Related Art

Currently, there exist numerous means for measuring a flow rate of fluid passing through a pipe, especially hydrocarbon fluids. Among the known techniques may be cited the use of an ultrasound device such as that described in patent U.S. Pat. No. 4,462,261.

However, the current measurement techniques are not reliable enough, especially when involved with carrying out a measurement of flow rate (and therefore of quantity) of product within the framework of a transaction, for example at a pipe outlet, of a refinery or an oil tanker.

An aim of the present invention is therefore to solve the problem cited above with the aid of a reliable and compact solution of simple design.

SUMMARY OF THE INVENTION

Thus, the subject of the present invention is a device for measuring the flow rate of a fluid flowing in a pipe, especially for a transaction between a hydrocarbon supplier and a purchaser, comprising:

a cylindrical body intended to be interposed between two sections of said pipe,
  ultrasound-beam transducers mounted on the main body and intended to measure at least a speed of displacement of the fluid stream when the latter passes through said device, and
  at least one converter intended to transform the signals emitted by the transducers into a flow rate signal,
characterized in that the transducers are mounted and distributed in a regular manner around two coaxial parallel rings, the transducers of a first ring being offset angularly with respect to the transducers of the second ring.

According to preferred embodiments, the device according to the present invention can furthermore comprise at least one of the following characteristics:

each ring comprising n transducers, n being an integer greater than or equal to 2, the angular offset between the transducers of the two rings is equal to $360°/(2n)$;
  n being equal to eight, each transducer of a ring comprises four emitters/receivers, each emitter/receiver being hooked up, by way of an ultrasound beam, with an emitter/receiver of four transducers of the other ring, and vice versa;
  each transducer of the first ring is linked with four transducers of the second ring which are offset angularly by $(180°\pm180°/n)$ and $(180°\pm540°/n)$ with respect to said transducer considered of the first ring, and vice versa;
  the rings are spaced 5 to 300 centimeters apart.

The invention also pertains to a method for measuring the flow rate of a fluid flowing in a pipe, especially for a transaction between a hydrocarbon supplier and a purchaser, implementing the device such as described above.

Advantageously, the ultrasound beams of certain transducers cutting one another at various nodes, the measurement of the flow rate is carried out both linearly, when each beam is cut individually by the fluid, and by using the Doppler effect at the level of each of said nodes.

The subject of the invention is also a fluid transport pipe, in particular for hydrocarbon fluid, characterized in that it is equipped with a device such as described above.

BRIEF DESCRIPTION OF THE DRAWINGS

The invention will now be described in greater detail with reference to particular embodiments given solely by way of illustration and represented in the appended figures in which.

DETAILED DESCRIPTION OF THE PREFERRED EMBODIMENT

Figure 1:
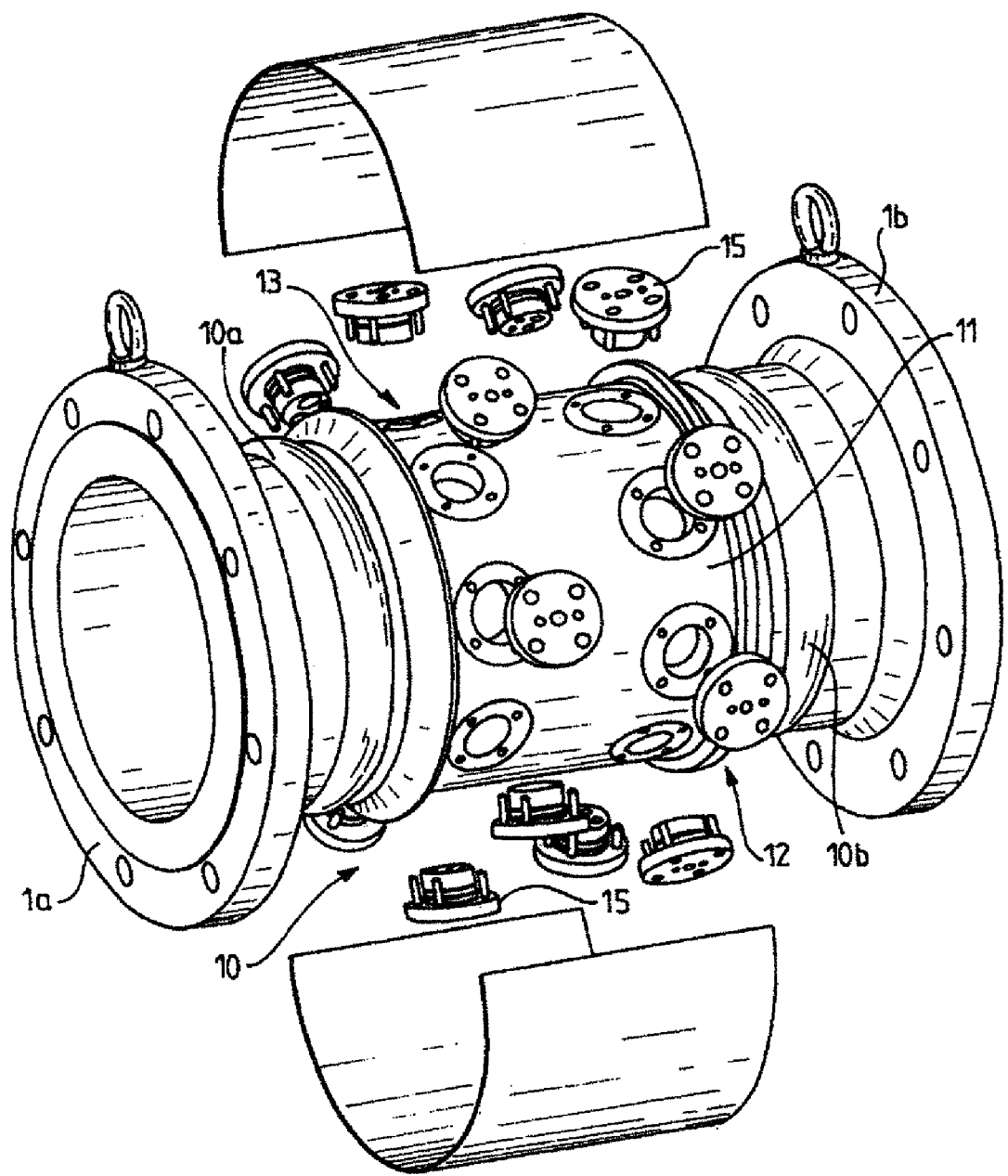
FIG. 1 is an exploded perspective view of a fluid flow rate measurement device in accordance with the present invention.

FIG. 1 represents, with the aid of an exploded perspective view, a fluid flow rate measurement device 10 intended to be placed, at the level of its ends 10a and 10b, between two sections of a hydrocarbon transport pipe (not represented) situated for example between an oil port and a refinery and of which only the fixing flanges 1a and 1b are represented.

More precisely, the fluid flow rate measurement device 10 makes it possible, by virtue of the use of ultrasound-beam transducers, to determine with very great accuracy the quantity of product supplied/purchased during a transaction between a supplier and a purchaser. It therefore constitutes a transactional flow rate measurement device.

Figure 2:
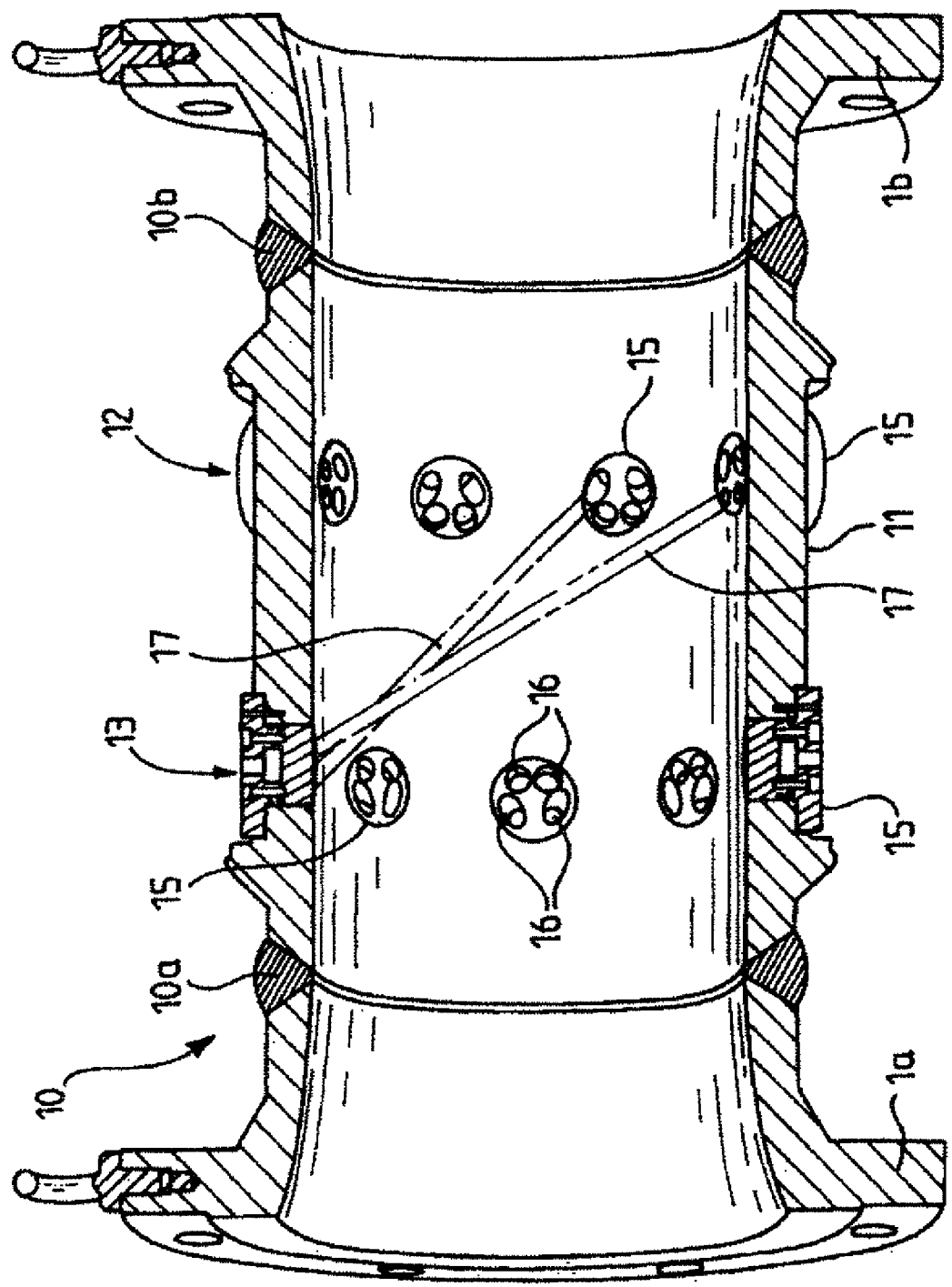
FIG. 2 is a longitudinal sectional perspective view of FIG. 1.

As is also visible in FIG. 2, this device 10 comprises an essentially cylindrical main body 11 made for example of corrosion-resistant metal such as stainless steel. The body 11 comprises two coaxial parallel rings 12 and 13 of transducers 15, which are linked to a signals converter (not represented). The two rings 12 and 13 are spaced apart axially by 5 to 300 centimeters, preferably by 6 to 60 centimeters.

Figure 3:
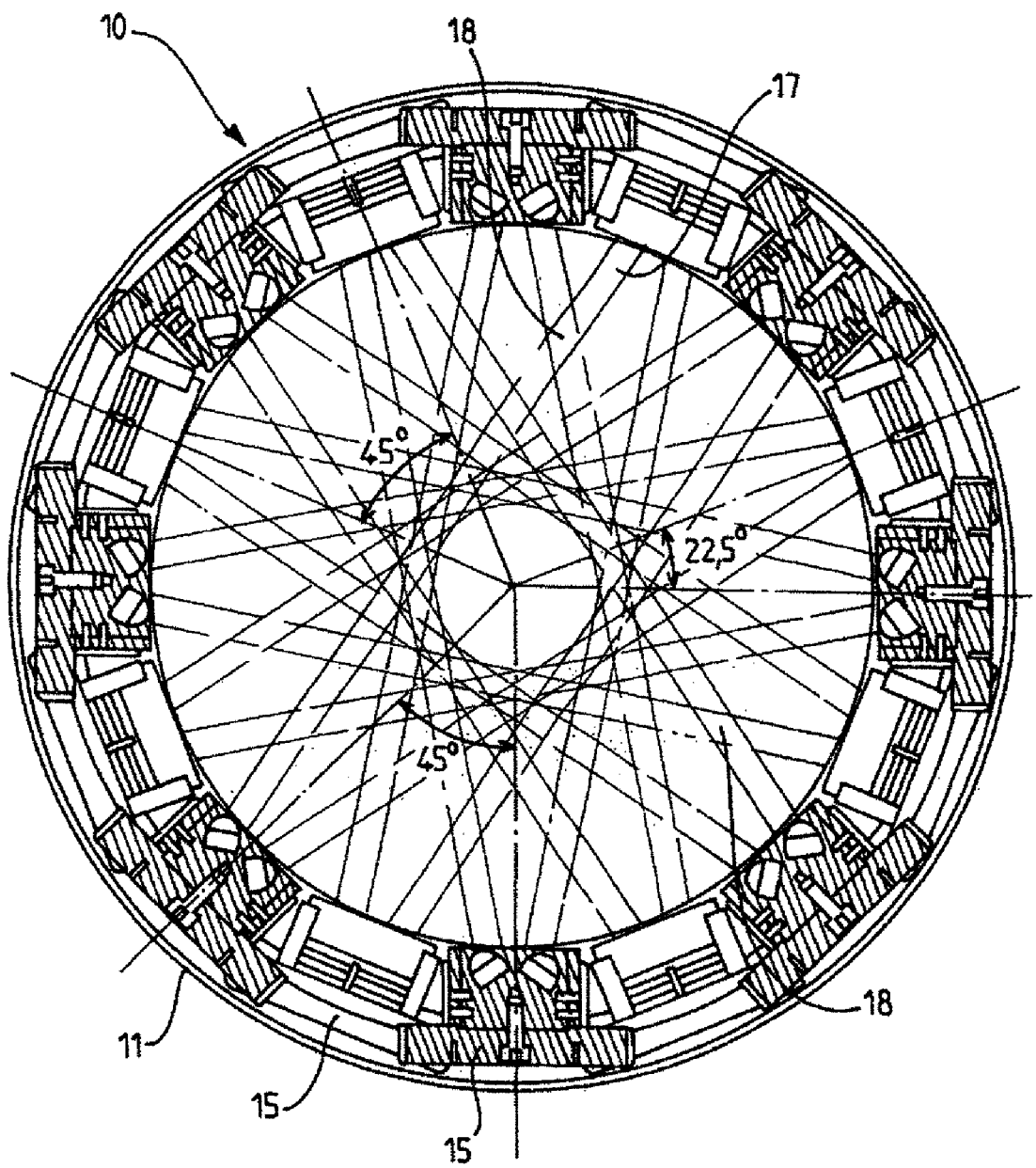
FIG. 3 is an end-on view of the device of FIG. 1 representing ultrasound beams emitted by transducers.
Figure 4:
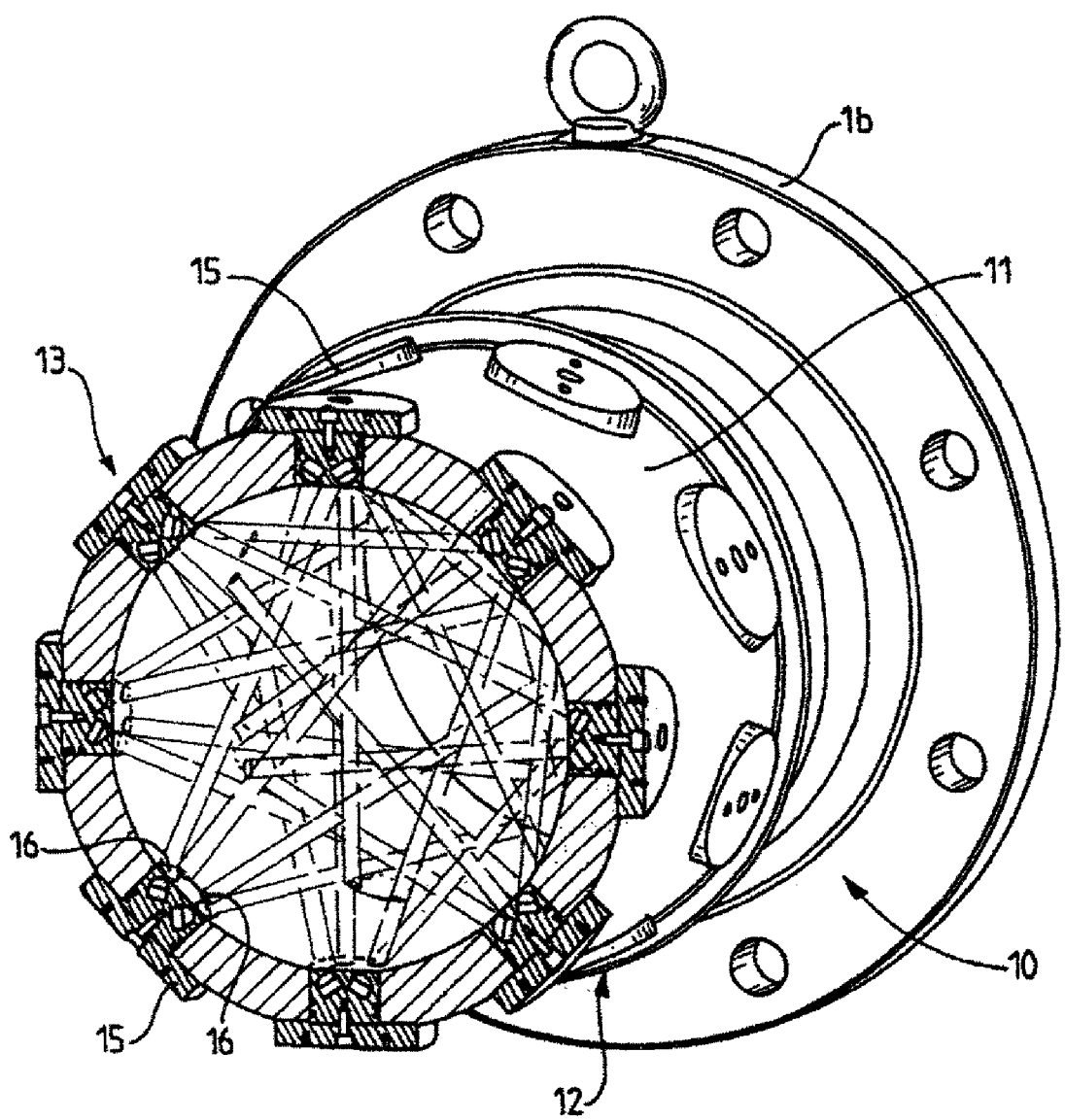
FIG. 4 is a perspective view of FIG. 3.
Figure 5:
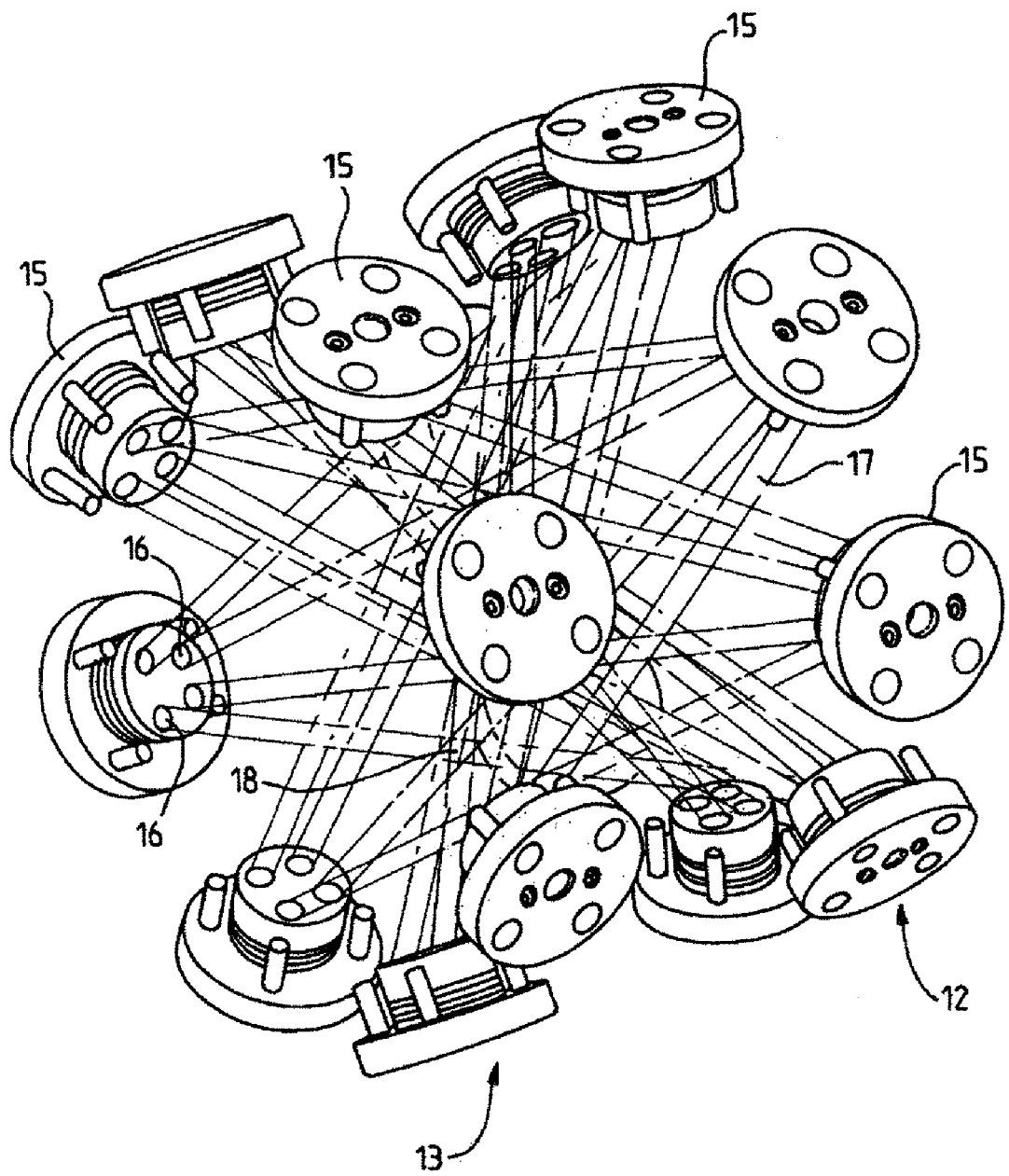
FIG. 5 is a perspective view representing solely the transducers emitting/receiving ultrasound beams.

As is visible in FIGS. 3 to 5, each of the rings comprises n transducers 15 distributed in a regular manner around its circumference, n being an integer greater than or equal to 2. More precisely, each ring comprises eight transducers 15 spaced angularly 45° apart.

Moreover, as is visible in FIG. 3, the transducers 15 of the ring 12 are offset angularly with respect to the transducers 15 of the ring 13 by a value equal to $360°/(2n)$, that is to say by 22.5° in the present case.

As is represented in greater detail in FIGS. 2 and 5, each transducer 15 comprises 4 ultrasound-beam emitters/receivers 16. Each emitter/receiver 16 of a transducer 15 of the ring 12 is hooked up, by way of an ultrasound beam 17, with an emitter/receiver 16 of four transducers 15 of the ring 13 (see FIGS. 4 and 5). Reciprocally, each emitter/receiver 16 of a transducer 15 of the ring 13 is hooked up, by way of an ultrasound beam 17, with an emitter/receiver 16 of four transducers 15 of the ring 12.

Figure 6:
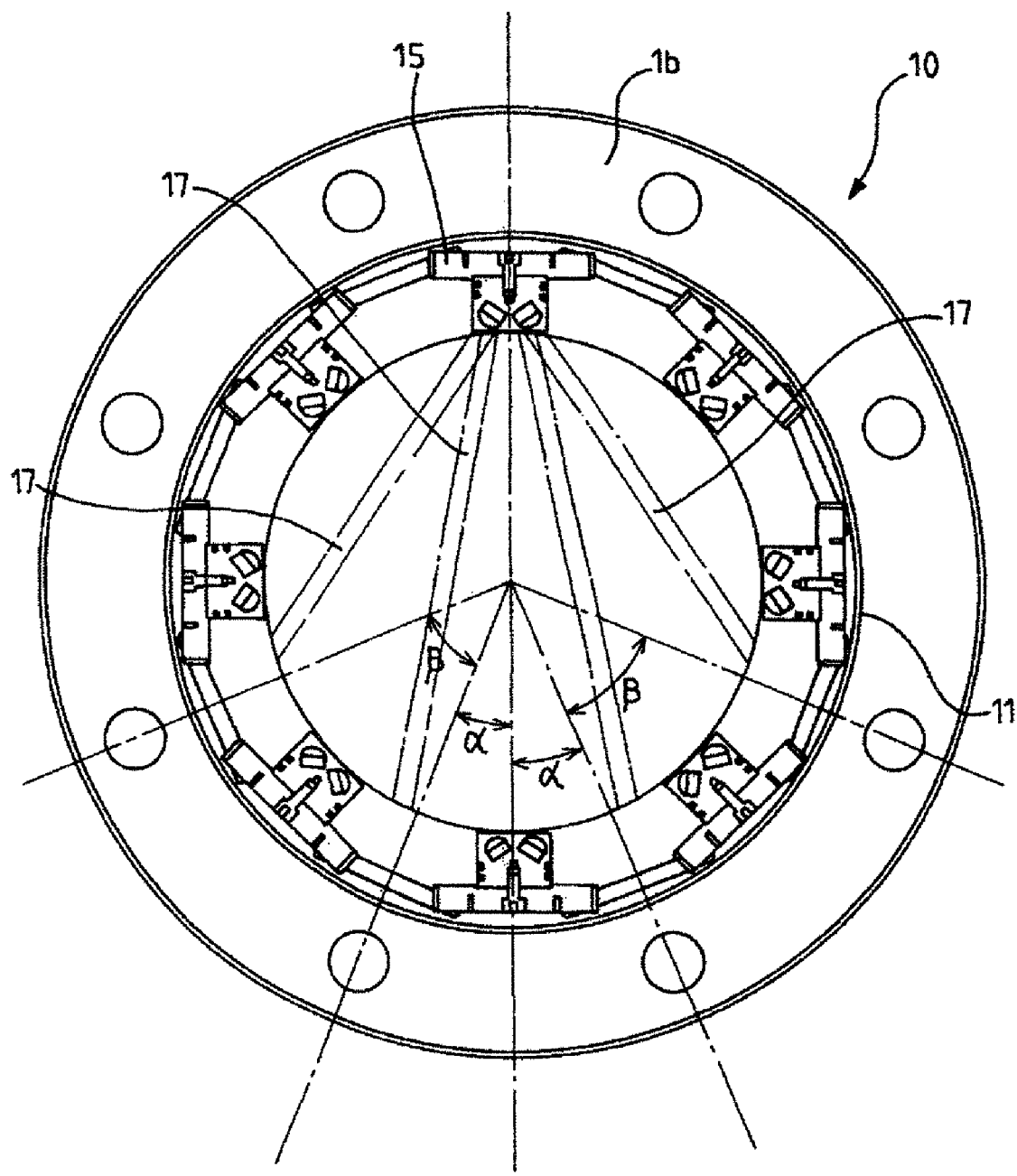
FIG. 6 is a transverse sectional view illustrating in particular the angular offset of the beams.

More precisely (FIG. 6), each transducer 15 of the first ring 12 is linked with four transducers 15 of the second ring 13 which are offset angularly with respect to said transducer 15 considered of the first ring 13 by an angle equal to $(180°\pm\alpha)$, α being equal to 180°/n, that is to say 22.5°, and by an angle equal to (180°±β), β being equal to 540°/n, that is to say 67.5°, and vice versa.

Thus, thirty two crossed ultrasound beams 17 are emitted/received between the eight transducers 15 of each of the two rings 12 and 13, thus multiplying the number of measured flow rate values.

The fluid flow rate measurement device 10 in accordance with the present invention operates in the following manner.

When the fluid passes through the pipe, it cuts the beams 17 linking the various emitter/receivers 16 of the transducers 15. When the beam is cut, a signal is emitted to the converter. Each time a beam is cut, the signal received is processed by the converter so as to deduce therefrom a fluid flow rate value. The presence of thirty two crossed beams thus makes it possible to provide thirty two measurements, thereby considerably honing the measurement.

Moreover, at each node 18 where certain beams 17 cut one another, a measurement by Doppler effect can also be carried out to supplement the linear measurement.

Thus, by virtue of the structure of the fluid flow rate measurement device 10 of the present invention, a very accurate value of flow rate may be determined, this being particularly advantageous when very high flow rates are involved, especially during a commercial transaction.

It goes without saying that the detailed description of the subject of the invention, given solely by way of illustration, does not in any way constitute a limitation, the technical equivalents also being included within the field of the present invention.

Thus, the number of transducers 15 can vary and be less than or greater than eight as long as an angular offset exists between the two rings, this offset not necessarily being equal to half the angular gap provided for between two consecutive transducers of one and the same ring.

The invention claimed is:

1. A device (10) for measuring the flow rate of a fluid flowing in a pipe, especially for a transaction between a hydrocarbon supplier and a purchaser, comprising:
   a substantially cylindrical main body (11) to be interposed between two sections of said pipe,
   ultrasound-beam transducers (15) mounted on the main body (11) and intended to measure at least a speed of displacement of the fluid when the fluid passes through said device (10), and
   at least one converter intended to transform the signals emitted by the transducers into a flow rate signal,
   characterized in that the transducers (15) are mounted and distributed in a regular manner around first and second coaxial parallel rings (12, 13), the transducers (15) of the first ring (12) being offset angularly with respect to the transducers of the second ring (13).

2. The device as claimed in claim 1, characterized in that, each of the rings (12, 13) comprises n transducers (15), n being an integer greater than or equal to 2, the angular offset between the transducers (15) of the two rings (12, 13) is equal to 360°/(2n).

3. The device as claimed in claim 2, characterized in that, n being equal to eight, each of the transducers (15) comprises four emitters/receivers (16), each of the emitters/receivers (16) of the first ring (12) being hooked up, by way of an ultrasound beam (17), with a respective one of the emitters/receivers (16) of the second ring (13).

4. The device as claimed in claim 3, characterized in that each of the transducer (15) of the first ring (12) is linked with a corresponding one of the transducers (15) of the second ring (13) so that the linked transducers (15) are offset angularly by (180°±180°/n) and (180°±540°/n).

5. The device as claimed in claim 1, characterized in that the rings (12, 13) are spaced 5 to 300 centimeters apart.

6. A method for measuring the flow rate of a fluid flowing in a pipe for a transaction between a hydrocarbon supplier and a purchaser, implementing the device (10) as claimed in claim 1.

7. The method as claimed in claim 5, characterized in that, the ultrasound beams (17) of certain transducers (15) cutting one another at various nodes (18), the measurement of the flow rate is carried out both linearly, when each beam (17) is cut individually by the fluid, and by using the Doppler effect at the level of each of said nodes (18).

8. A fluid transport pipe for hydrocarbon fluid, characterized in that the pipe is equipped with a device (10) as claimed in any one of claims 1 to 5.

* * * * *

UNITED STATES PATENT AND TRADEMARK OFFICE
CERTIFICATE OF CORRECTION

| | | |
|---|---|---|
| PATENT NO. | : 8,336,394 B2 | Page 1 of 1 |
| APPLICATION NO. | : 12/812527 | |
| DATED | : December 25, 2012 | |
| INVENTOR(S) | : Denis Laurent | |

It is certified that error appears in the above-identified patent and that said Letters Patent is hereby corrected as shown below:

Title Page, should read
(73) Assignee: Metering & Technology Limited (UK)

Signed and Sealed this
Eleventh Day of November, 2014

Michelle K. Lee
*Deputy Director of the United States Patent and Trademark Office*